Oct. 31, 1933.  J. BIJUR  1,932,393

BEARING LUBRICATION

Filed Aug. 16, 1929  2 Sheets-Sheet 1

INVENTOR
Joseph Bijur
BY
his ATTORNEYS

Oct. 31, 1933.    J. BIJUR    1,932,393
BEARING LUBRICATION
Filed Aug. 16, 1929    2 Sheets-Sheet 2
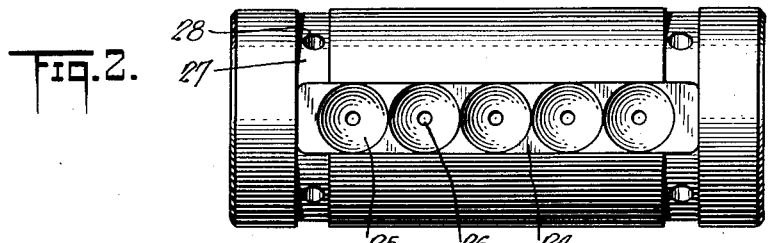
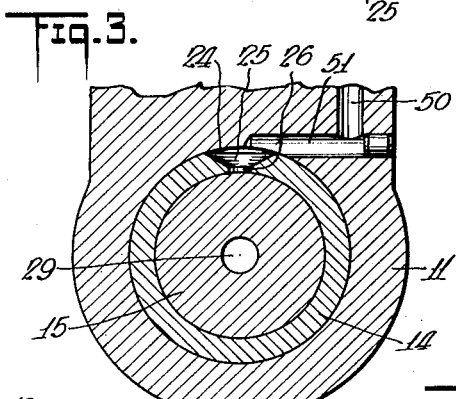
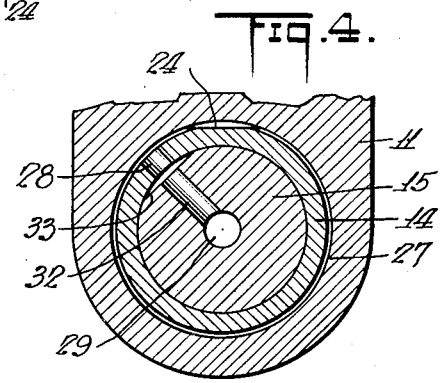
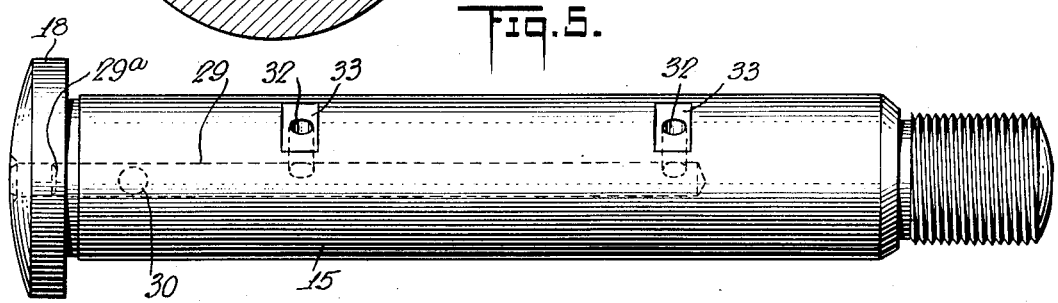
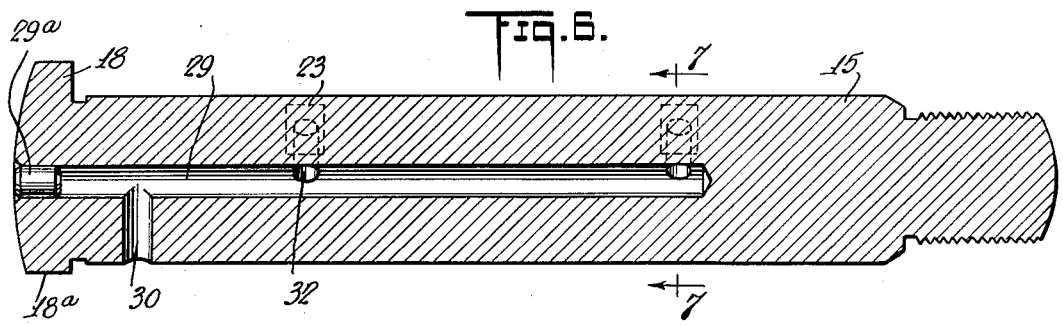
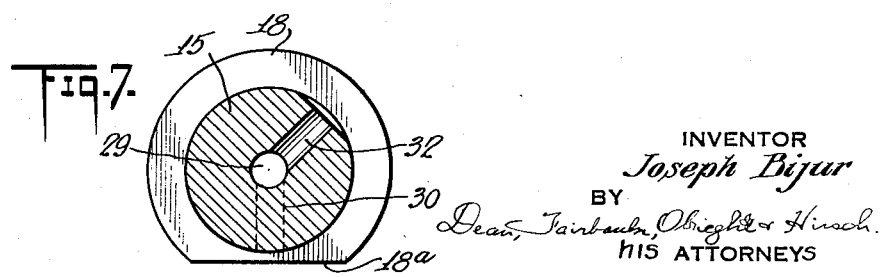
INVENTOR
Joseph Bijur
BY
Dean, Fairbank, Obright & Hirsch.
his ATTORNEYS Patented Oct. 31, 1933

1,932,393

UNITED STATES PATENT OFFICE 1,932,393

BEARING LUBRICATION

Joseph Bijur, New York, N. Y., assignor to Auto Research Corporation, a corporation of Delaware Application August 16, 1929. Serial No. 386,279

25 Claims. (Cl. 184—7)

The present invention is concerned primarily with the lubrication of bearings, and while capable of a wide range of utility, finds its preferred embodiment in the lubrication of eccentrically loaded bearings such as those of shackle bolts for automobile springs.

In certain eccentrically loaded swivel bearings, the lubricant tends to flow or move away from the loaded portion of the bearing surface and this may be true also of certain slide bearings.

One specific type of bearing with which the invention is particularly concerned, involves a horizontal bolt and bushing loaded at the upper surface, from which, however, the oil tends to flow by gravity to the lower surface.

Among the objects of the invention are to provide adequate lubrication of such bearings without enlarging or unduly complicating the bearing structure, without the addition of accessory fixtures and without excessive over-oiling, the bearing being well suited for use with a centralized lubricating system.

From another aspect, and independently of loading conditions, the invention has for an object the correct distribution of lubricant along substantially the entire length of the top side of an elongated swivel or slide bearing to prevent the localized oiling and resultant dry spots apt to occur when a single oil hole feeds to a long, generally horizontal gravity-draining bearing surface, yet to avoid any substantial loss of bearing surface or weakening of the bearing structure.

Another object is to provide a shackle including pivot bolts adapted for attachment to a load and load support respectively and even though only one of the bolts may require special lubricant treatment to avoid any possibility of confusion in assembling the bolts.

In a preferred embodiment of the invention a loaded surface of the bearing, say the upper side thereof, is adequately lubricated by maintaining it in constant communication at a plurality of points with a reservoir of oil. This reservoir is usually formed in one of the cooperating bearing elements, in the case of a shackle either the bushing or the bolt. The reservoir is so arranged that flow from the outlets thereof is normally blocked by the tight fit between the engaging loaded surfaces of the bearing elements and relative movement of such elements causes oil to be wiped onto the surface of the one which is movable relatively to the reservoir. The reservoir is of ample capacity to maintain in an intermittently charged system adequate lubricant at the point where it is most needed during the periods between charges.

The invention is peculiarly applicable to the lubrication of the pivot bolts of an ordinary shackle, such as that used to support a vehicle chassis frame on its springs. These shackles are swively connected at spaced points to the frame and spring respectively and at least one shackle bolt, regardless of whether the shackle is of the compression or tension type, is loaded on its upper face, with the result that oil not only gravitates away from such face but is squeezed into the greater non-wearing clearance space at the opposite lower side of the bolt.

In accordance with my present invention the bushing of this bolt is formed with a longitudinally extending oil distributor and reservoir therein having a plurality of outlets opening onto the top of the bolt. The tight fit between the bolt and bushing along the line of lubricant openings serves as a fairly tight closure to prevent free flow from the reservoir and to permit delivery of oil only by the wiping action above described. Overflow from the reservoir is preferably conveyed to oil the other shackle bolt or to subsidiary mechanism requiring lubrication.

The invention may be more fully understood from the following description in connection with the accompanying drawings, wherein Fig. 1 is a view mainly in vertical section and partly in side elevation taken through a compression shackle and associated mechanism shown on an enlarged scale and illustrating the invention as applied to such shackle.

Fig. 2 is a plan view of the bushing.

Figs. 3 and 4 are transverse sectional views respectively on the lines 3—3 and 4—4 of Fig. 1.

Fig. 5 is a plan view of one of the pivot bolts.

Fig. 6 is a longitudinal sectional view therethrough, and

Fig. 7 is a transverse sectional view on the line 7—7 of Fig. 6.

Figure 1:
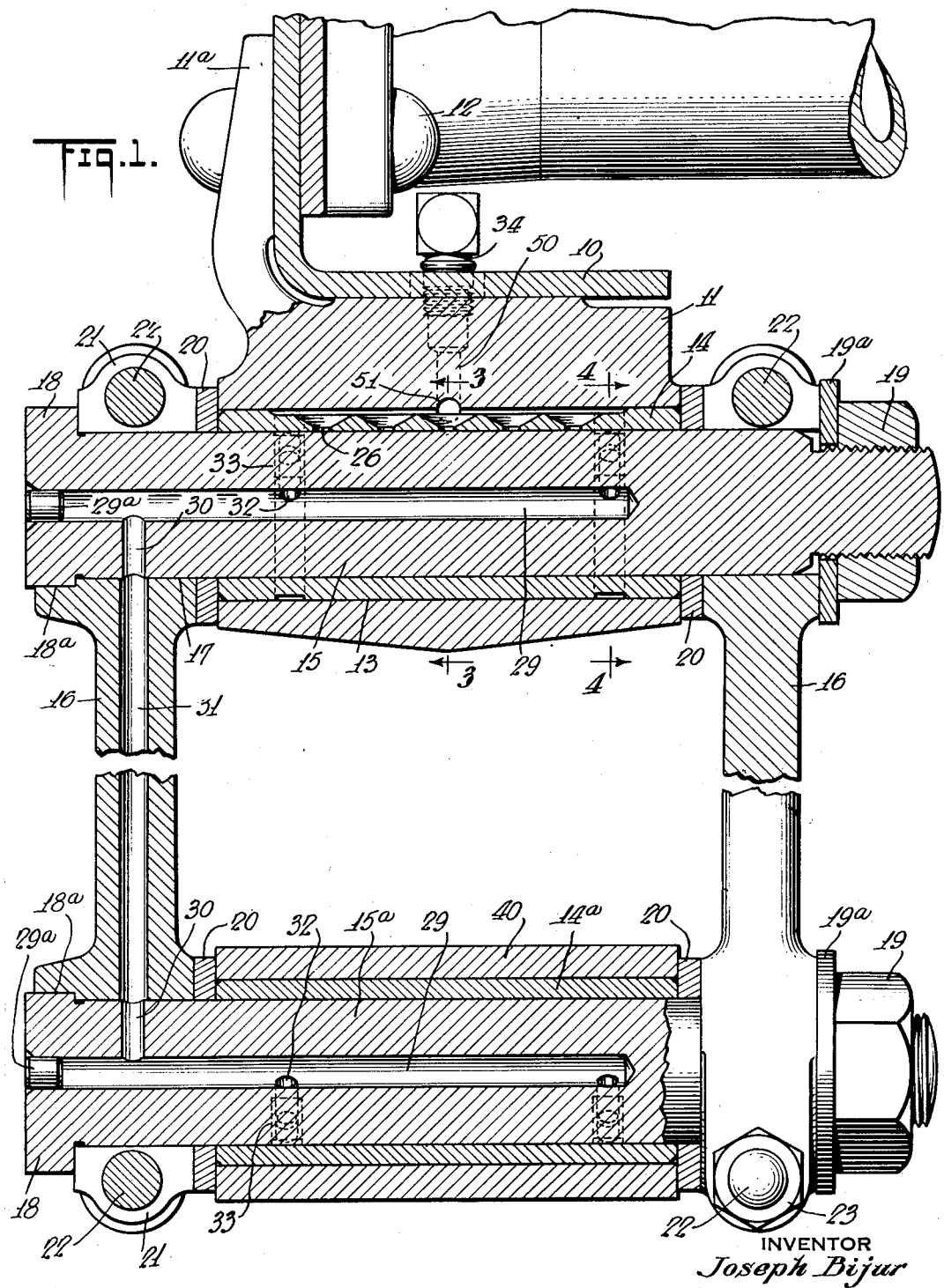

I have illustrated the invention applied to a more or less standard type of compression shackle used to support the weight of a vehicle upon the front springs.

In the drawings the usual channelled chassis frame bar 10 has a bracket 11 fixed to its under side, this bracket including an upstanding arm portion 11ª riveted at 12 to the bar 10 and having its pendant portion of generally circular cross sectional shape and provided with a longitudinal bore 13 therein, into which the bushing 14 is force fitted. Correspondingly the eye 40 formed at the end of the vehicle spring has a bushing 14ª force fitted therein.

The shackle includes the two pivot bolts 15 and 15ª with their intermediate portions rotatable in the bushings 14 and 14ª respectively and with their protruding ends fixed relatively to the bolt-connecting links 16 of the shackle.

In accordance with standard practice, the ends of the links 16 are provided with suitable eyes 17 receiving the projecting ends of the bolts, these eyes being intersected by vertical slots 21 defining split bearings which by bolts 22 and nuts 23 may be tightened to clamp the ends of the pivot bolts 15, 15ª.

The upper and lower pivot bolts are preferably identical, each including a head 18 to engage the machined outer face of one link 16, this head being flattened at 18ª to key into or fit a suitably prepared portion at the outer face of the link. The other end of each bolt is screw threaded for the reception of a nut 19 tightened against the outer face of the opposite link. Preferably washers 20 are interposed between the inner faces of the links and the adjacent surfaces of the bushings 14, 14ª and the bracket 11 or spring eye 40, as the case may be. Washers 19ª are preferably interposed between the nuts 19 and the links. As thus far described, the construction may be entirely conventional.

It will be apparent that inasmuch as the shackle bolts and links act as a rigid load transmitting unit, the load of the vehicle will be sustained upon the upper side of the upper bolt 15 and transmitted to the spring through the lower side of the lower bolt 15ª.

My present invention is primarily concerned with the provision of means for efficiently lubricating the loaded top side of the bolt 15 despite the tendency of lubricant to squeeze out between the bearing surfaces at this point, drain by gravity to the lower unloaded portion of the bolt surface and leave dry the upper surface, where most of the wear occurs.

With this in view a reservoir is formed in and extends longitudinally of the upper outer side of the bushing 14. Various methods of forming the reservoir might be employed but I prefer to use a flat 24 longitudinally of the upper part of the bushing and to countersink a line of communicating wells 25 in the flat, these wells having wide mouths tapering to restricted bottoms which communicate through relatively small orifices 26 with the inner surface of the bushing. The ends of the flat 24 are intersected by shallow annular grooves 27, into which the reservoir overflows, these grooves (Fig. 4) communicating by ports 28 with the inner face of the bushing.

As above stated, the bolts are preferably identical in construction, each having a central longitudinally extending dead end bore 29 therein, with its open end plugged at 29ª. A pair of radial oil ducts 32 in each bolt lead from the bore 29 to flats 33 at the outer surface of the bolt. A third radial duct 30 in each bolt extends from the central passage 29 to a portion of the bolt surface circumferentially remote from the flats 33.

The construction of the left hand link 16 of the shackle is such that in fitting the bolts in place so that their heads coact properly with the link, the upper bolt has its ducts 32 extending generally upwardly and its duct 30 extending generally downwardly, whereas in the lower bolt the reverse is true, duct 30 extending upwardly and the ducts 32 extending downwardly.

Certain of the ports 28 in the bushing 14 are in substantially registry with the radial ducts 32 in the upper bolt so that excess oil flowing in the channels 27 will pass through ports 28 and ducts 32 to the central bore 29 of the pivot bolt 15. The flats accommodate for free passage of oil even at times when the ducts 32 are misaligned with bores 28 by rotation of bolt 15. Also some oil escapes from these flats and further aids in lubrication of the upper bolt. An oil passageway 31 in the left hand link registers with the passageway 30 so that oil drains from the upper bolt into the central passageway of the lower bolt and thence through the passageways 32 in the lower bolt onto the lower loaded bearing surface thereof.

The reservoir in the bushing 14 would tend to drain freely onto the top surface of the bolt 15 save for the fact that the load being transmitted through the upper sides of the bolt and bushing leaves very little clearance between them and oil slowly wiped from the ports 26 by the moving bolt 15 is merely sufficient to maintain the loaded side of this bolt well oiled.

Due to the small size of the ports 26 there is very little loss of active load sustaining bearing surface between the bolt 15 and its bushing.

Even independently of the load factor the reservoir is of utility simply as a distributor since it prevents localized oiling of the bolt such as might occur where a single small oil hole feeds onto the top of the upper bolt. Functioning as a distributor, the reservoir insures oiling of the bolt at a plurality of points arranged in a line extending longitudinally of the bolt surface. A similar action cannot readily be obtained by a channel on the inner face of the bushing without danger of excessive overoiling and without substantial reduction of available bearing surface.

Many methods might be used for insuring proper feed of oil to the reservoir either from an independent lubricant tank or cup mounted on the bracket 11 or from a central lubricant reservoir from which oil is distributed to lubricate other chassis bearings as well as the shackles.

In the present instance I have shown a flow restricting drip plug fitting 34 of the general character disclosed in my prior Patent No. 1,632,772 dated June 14, 1927, this plug receiving lubricant from a central source through any suitable conduit (not shown) and being screwed into a vertical oil passageway 50 in the bracket, which delivers through horizontal bore 51 into the reservoir.

As the oil flows through passage 51 either in a slow continuous stream or in intermittent relatively larger charges, it first fills up the central well of the reservoir, then overflows into the adjacent wells, finally completely filling the reservoir itself and overflowing into the grooves 27 from whence it finds its way to the lower shackle bolt as above explained. The extremely slow wiping feed from the reservoir onto the loaded top of the bolt 15, obviates any need for frequent charging of the reservoir and adapts the device for a continuous feed from a central pressure system, if said feed slightly exceeds the rate of oil escape from the openings 26.

It will be apparent that while I have shown the invention embodied in shackle bolts of the character in which overflow from one bolt lubricates the other, it is well adapted for embodiment wherever an analogous condition exists, that is to say, in any location where the load is taken on the part of a bearing from which lubricant tends to escape and the problem of maintaining proper lubrication at this point must be taken care of.

In specific shackle bolt applications, there are often times when the lower bolt, rather than the upper one, has its top side loaded, as for instance, in certain shackles used as tension devices to hang the load from the spring. In such case, a reservoir identical with that above described would be formed in the lower bearing which in such case would be in the channelled frame, as in the case of the compression shackle shown in the drawings. Lubricant could be conveyed upwardly to the spring bearing by the arrangement shown and claimed in my prior Patent 1,618,122 of February 15, 1927.

It is to be understood that the invention of the present application as specified in the accompanying claims may be employed in the lubrication of bearings other than chassis bearings, and/or to the lubrication of other chassis bearings than shackle bearings.

I claim:

1. In a loaded swivel bearing of the type including a bushing structure in which oil tends to flow toward the under side of the bearing and the thrust of the load is sustained on the upper side thereof, means to maintain and distribute a supply of lubricant at and above the loaded side of the bearing in the bushing structure.

2. In a loaded swivel bearing of the type including a bushing structure in which oil tends to flow toward the under side of the bearing and the thrust of the load is sustained on the upper side thereof, means to maintain and distribute a supply of lubricant at and above the loaded side of the bearing, including a lubricant reservoir having a plurality of outlets leading to the loaded bearing surface in the bushing structure.

3. In a loaded swivel bearing including complementary bearing elements and of the type in which oil tends to flow by gravity to the under side of the bearing and the thrust of the load is sustained on the upper side thereof, a lubricant reservoir in one of the complementary bearing elements above the loaded side, an outlet from said reservoir directly down to said loaded side, the flow from which outlets is controlled by the bearing movement.

4. In an elongated swivel bearing of the bushing and pin type and a lubricant distributing channel in the bushing above and communicating directly downwardly with the bearing surface through a line of relatively small oil feed openings.

5. In a loaded swivel bearing of the bushing and pin type and in which oil tends to flow by gravity to the under side of the pin and the thrust of the load is sustained on the upper side thereof, means to maintain a supply of lubricant at the loaded side of the bearing including a lubricant reservoir in the upper side of the bushing and having a plurality of oil outlets from which oil feeds upon the upper side of the pin.

6. In a loaded swivel bearing of the bushing and pin type and in which oil tends to flow by gravity to the under side of the pin and the thrust of the load is sustained on the upper side thereof, a lubricant reservoir formed in the upper side of the bushing and having a plurality of oil outlets from which oil is wiped upon the upper side of the pin, the loaded pin restraining seepage from said outlets when the pin and load are relatively stationary.

7. In a loaded swivel bearing of the bushing and pin type and in which oil tends to flow by gravity to the under side of the pin and the thrust of the load is sustained on the upper side thereof, means to maintain a supply of lubricant at the loaded side of the bearing including a lubricant reservoir above the loaded side in the bushing having a plurality of downwardly extending outlets leading to the loaded bearing surface, the load-compelled tight fit between bearing pin and bushing at such surface tending to resist flow of oil from the reservoir.

8. A load transmitting shackle of the type which is swivelly connected at spaced points to the load and a load support respectively, the relation of the load, shackle and support being such that the upper side of one swivel bearing sustains the trust of the load, means for maintaining the upper side of such bearing in communication over a considerable portion of its length with a reservoir of lubricant and means to direct overflow of oil from the reservoir to the other bearing.

9. A load transmitting shackle of the type which is swivelly connected at spaced points to the load and a load support respectively, the relation of the load, shackle and support being such that the upper side of one swivel bearing sustains the thrust of the load, means for maintaining the upper side of the first mentioned bearing in communication over a considerable portion of its length with a reservoir of lubricant and means to supply oil to one bearing by oil overflow from the other.

10. A load transmitting shackle of the type which is swivelly connected adjacent its top and bottom to the load and a load support respectively, each swivel joint comprising complementary bearing elements, the arrangement of such elements relatively to the load and support being such that the upper side of the upper swivel bearing and the lower side of the other sustains the thrust of the load, means for maintaining the loaded side of the upper bearing in communication over a considerable portion of its length with a reservoir of lubricant, and means to gravitationally supply oil to the lower bearing by overflow from the upper one.

11. A shackle including spacing links, upper and lower pin and brushing bearings adapted to connect said links to a load and a load support, each pin having an internal oil duct therein, and radial ducts extending from said internal oil duct to the bearing surface, an oil passageway at one of the links connecting said internal ducts, the radial ducts leading to the upper part of the upper pin and the lower part of the lower pin and an oil distributor channel in the outer top side of the upper bushing adapted for connection to an oil supply and communicating with the radial ducts of the upper bearing pin.

12. A shackle including spaced links, upper and lower pin and bushing bearings adapted to connect said links to a load and a load support, each pin having an internal oil duct therein, and a plurality of oppositely directed radial ducts extending from said internal duct to the bearing surface and to the contact surface with the links, an oil passageway in one of the links connecting one pair of said internal ducts, the other radial ducts leading to the loaded sides of the respective bearings.

13. A shackle including spaced links, upper and lower pin and bushing bearings adapted to connect said links to a superjacent load and a subjacent support, each pin having an internal longitudinal oil duct therein, and radial ducts extending from said duct to the loaded side of the bearing surface, an oil passageway in one of the links connecting said internal ducts, an oil distributing channel in the outer top side of the upper bushing connected to an oil supply and to the radial ducts of the upper bearing pin, said channel serving as an oil reservoir for the top bearing surface of the upper pin and communicating through a line of openings with said surface.

14. A shackle including spaced links, upper and lower pin and bushing bearings adapted to connect said links to a load and a load support respectively, each pin having an internal oil duct therein, and radial ducts extending from said internal duct to the bearing surface, an oil passageway in one of the links connecting said internal ducts, the radial ducts leading to the upper surface of the upper pin and the lower surface of the lower pin and an oil distributor channel in the outer top side of the upper bushing connected to an oil supply and to the radial ducts of the upper bearing pin, said channel serving as an oil reservoir for the upper bearing surface of the upper pin, communicating through a line of openings with said surface and overflowing into the radial oil ducts of the upper pin.

15. A swivel bearing including a bushing for disposition with its longitudinal axis in a substantially horizontal plane, a bearing pin swivelling in the bushing and held against the end-wise displacement therein, the bushing having a longitudinally extending oil reservoir in its outer upper surface, and having a plurality of downwardly extending openings therein leading from the reservoir to the inner surface of the bushing.

16. A swivel bearing including a bushing for disposition with its longitudinal axis in a substantially horizontal plane, a bearing pin swivelling in the bushing, the bushing having a longitudinally extending oil reservoir therein, having a plurality of openings therein leading from the reservoir to the inner surface of the bushing, said bushing having annular external grooves into which the reservoir overflows.

17. A swivel bearing including a bushing for disposition with its longitudinal axis in a substantially horizontal plane, a bearing pin swivelling in the bushing and held against endwise displacement therein, the bushing having a longitudinally extending oil reservoir therein, and having a plurality of openings therein leading from the reservoir to the inner surface of the bushing, said bushing having annular external grooves into which the reservoir overflows, said pin having an internal oil duct therein and radial ducts connecting it with the oil grooves in the bushing.

18. A swivel bearing including a bushing for disposition with its longitudinal axis in a substantially horizontal plane, a bearing pin swivelling in the bushing and held against endwise displacement therein, the bushing having a longitudinally extending oil reservoir therein, having a plurality of openings therein leading from the reservoir to the inner surface of the bushing, and having annular external ported grooves into which the reservoir overflows, said pin having an internal oil duct therein and radial ducts approximately aligned with the ports in the bushing oil grooves, the pin being flattened at the outer ends of the radial ducts to accommodate for movement of said ducts relative to the ports.

19. As a new article of manufacture, a bearing bushing having an external longitudinally extending flat therein serving as an oil reservoir a plurality of countersinks extending below the surface of said flat and a plurality of ports leading from said countersinks to the interior of the bushing.

20. As a new article of manufacture a bearing bushing having an external longitudinally extending oil reservoir formed in the outer surface thereof and a plurality of ports leading from said reservoir to the interior of the bushing, said reservoir comprising a row of connected countersinks.

21. As a new article of manufacture, a bearing bushing having an external longitudinally extending oil reservoir in its outer surface and a plurality of ports leading from said reservoir to the interior of the bushing, said bushing also having annular grooves in its exterior surface into which the reservoir is adapted to overflow.

22. As a new article of manufacture, a bearing bushing having an external longitudinally extending oil reservoir therein and a plurality of ports leading from said reservoir to the interior of the bushing, said bushing also having annular grooves in its exterior surface into which the reservoir is adapted to overflow, and ports leading from said grooves to the interior of the bushing.

23. In an eccentrically loaded bearing including relatively movable bearing elements, and of the character in which oil tends to flow away from the loaded area thereof, a reservoir above said loaded area to maintain a supply of lubricant at such area, means to distribute lubricant from said reservoir downwardly to said area, and means to lubricate another bearing by overflow from the reservoir.

24. In an eccentrically loaded bearing including relatively movable bearing elements and of the character in which oil tends to flow away from the loaded surface thereof, a reservoir to maintain a supply of lubricant at said area, means to distribute lubricant from said reservoir to said area, and means to lubricate another bearing by overflow from the reservoir, said last mentioned means including a system of passageways leading through the bearing elements across the loaded area.

25. In an eccentrically loaded bearing including relatively movable bearing elements and of the character in which oil tends to flow away from the loaded surface thereof, a reservoir to maintain a supply of lubricant at said area, means to distribute lubricant from said reservoir to said area, and means to lubricate another bearing by overflow from the reservoir, said last mentioned means including passageways through both elements on both sides of said reservoir.

JOSEPH BIJUR.